Dec. 13, 1927.
W. A. PROCTOR
WINDSHIELD REGULATOR
Filed Aug. 8, 1925
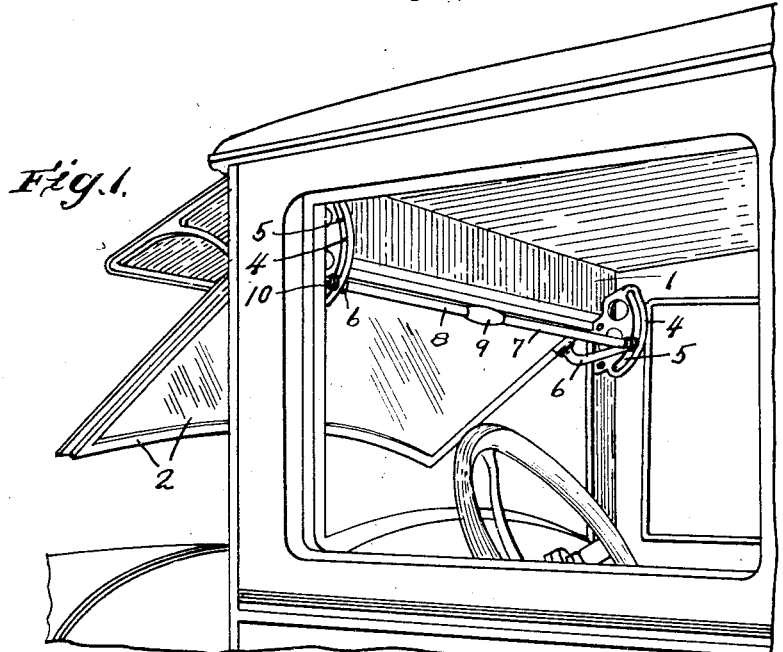
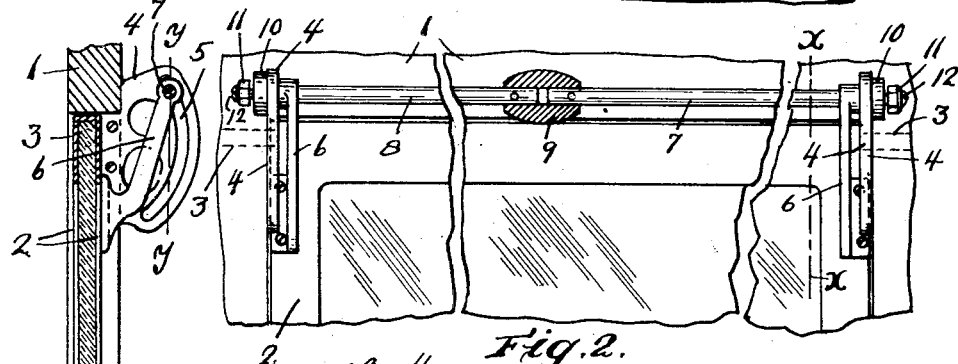
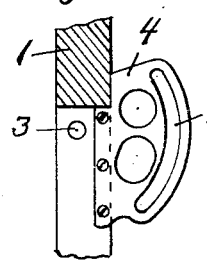
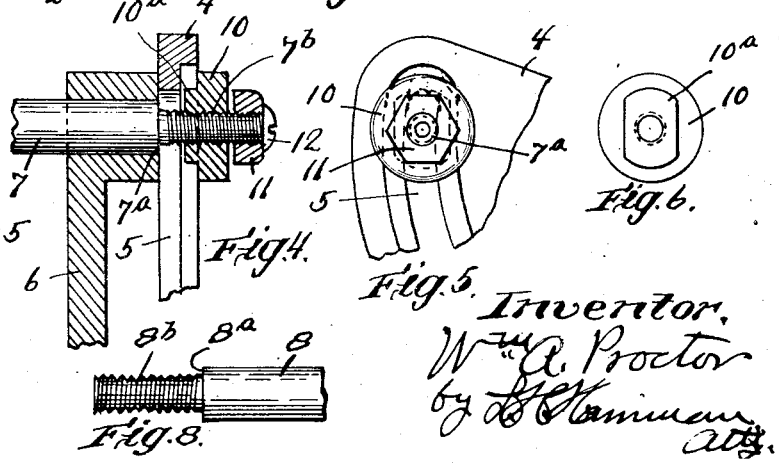
Inventor,
W. A. Proctor Patented Dec. 13, 1927.

1,652,638

UNITED STATES PATENT OFFICE.

WILLIAM A. PROCTOR, OF AMESBURY, MASSACHUSETTS.

WINDSHIELD REGULATOR.

Application filed August 8, 1925. Serial No. 48,951.

This invention relates to that class of devices used in connection with automobile bodies for locking the wind shield in various positions of adjustment, particularly in those instances where the shield is pivotally mounted at one edge, usually the upper edge, and is swung on its pivots to different positions to vary the extent to which it is opened.

So far as I am aware, the only type of device for holding a pivoted wind shield in various positions of adjustment, which is in general or extensive use, are those which are mounted at each end of the shield and have independent locking means, making it necessary to unlock the shield at each end, then adjust it, and then lock it again at each end in the adjusted position. With locking means of such a character it is usually difficult or unsafe for the driver to adjust the wind shield while the car is in motion, and in many instances the use of both hands is necessary in order to make the adjustment, so that the driver usually has to stop the car before the adjustment can be made.

While devices have been constructed which enable the driver to adjust the shield with one hand while operating the car, yet so far as I am aware, prior to my present invention, no device of this character has been produced which has been considered sufficiently practical and inexpensive to justify general adoption.

The objects of my invention are to provide a means for adjusting the pivotally mounted wind shield of a closed automobile body, which is adapted for application to any ordinary type of closed body, which is of simple and durable construction, having a manufacturing cost but slightly in excess of the ordinary adjustable brackets now generally employed, which is adapted to lock the shield securely in any position to which it may be adjusted and is adapted to be readily unlocked, adjusted and locked by using one hand only.

I accomplish these objects by means of the construction hereinafter described and illustrated in the accompanying drawing in which:—

Fig. 1 is a perspective view showing the application of a preferred embodiment of my invention to a common type of automobile body.

Fig. 2 is a front elevation of the device.

Fig. 3 is a sectional view at line $x$—$x$ of Fig. 2.

Fig. 4 is a sectional view at line $y$—$y$ of Fig. 3, on an enlarged scale.

Figs. 5 and 6 are detail views of one of the clamping nuts.

Fig. 7 is a detail view of one of the holding brackets and

Fig. 8 is a detail view of the left end of the adjusting rod.

In the drawing 1 indicates the frame of the front window opening of a closed body automobile and 2 the frame of a wind screen glass, or shield which is mounted to swing, on a pivot 3 at its upper edge, from a vertical position, in which the window opening is closed, forwardly to various positions, as indicated in Fig. 1.

According to my invention I provide a pair of metal brackets 4, which are rigidly fixed in vertical positions on the frame 1 at each end of the window opening, said brackets being in the form of flat plates arranged to extend in perpendicular relation to the axis about which the shield 2 swings, each being provided with an arc shaped slot 5 having its center on the line of said axis. A pair of rigid metal arms 6 are rigidly secured at their base ends to the wind shield frame at each end thereof and each arm is provided with a bearing aperture adjacent its end, said apertures being arranged in alignment with each other with their center line parallel to the axis of the screen and intersecting the middle line of the arc shaped slot 5 in the brackets 4. Said arms are attached to the inner side of the shield frame at a suitable distance beneath the pivotal support thereof and extend obliquely upward and rearward therefrom.

A pair of stiff rods 7 and 8, which are rigidly connected and held in alignment by a handle 9, are journaled, to rotate about an axis parallel to the axis on which the shield 2 swings in the bearing apertures of the right and left arms 6 and are extended through the slots 5. The diameter of rods 7 and 8 is somewhat greater than the width of slots 5 and the portion of each rod which extends through the slots is reduced in diameter forming shoulders $7^a$, $8^a$, respectively, which are arranged to engage the adjacent surfaces of the brackets 4 at each side of the slots 5. The reduced end portions $7^b$, $8^b$ of the shafts are screw threaded, the right hand shaft 7 having a right thread and the left hand shaft 8 having a left thread. A pair of nuts 10 are provided, which are respectively adapted to be threaded on the end portions 7ᵇ, 8ᵇ of the rods, and each nut is adapted to be engaged with the opposite sides of the brackets 4 at each side of the slots therein. Each nut is provided with a flattened boss 10ª, which extends into the slot, so that its flattened sides engage the edges of the slot, and act to prevent the nuts from turning relative to the brackets. A stop nut 11 is provided on the threaded end portion of each rod, normally out of contact with nut 10, and being held in position by a screw 12 in the rod, or other suitable means. In setting up the device, the handle 9, which has a central bore in which the adjacent end portions of rods 7 and 8 extend, is not permanently secured to both rods until all adjustments have been made, the shoulders 7ª, 8ª being brought into close proximity to the adjacent surface of the brackets 4, but not in such close contact as to cause substantial friction when the window is adjusted, and the nuts 10 then being screwed onto the rods sufficiently to clamp the brackets 4 between the nuts and the respective shoulders on the rods. The handle 9 is then permanently secured to both rods by means of pins or set screws, so that the rods operate as a single rod, and are such for all intents and purposes.

The arrangement is such that when the window or shield is fully closed the nuts 10 will be held in the extreme upper ends of the slots 5, as shown in Fig. 3, in which position the brackets 4 will be firmly clamped between the shoulders on the rods and the sides of the nuts 10, so that the window cannot be opened without unlocking it and there will be no possibility of rattling of the parts which lock it. It will be understood that there will be a slight, inconsequential springing of the brackets when they are clamped against the shoulders of the rod by the nuts.

In opening, or adjusting the shield, the operator merely grasps the handle 9 and turns the rod to the right for a small fraction of a turn, thereby causing both nuts 10 to be unscrewed from the rod portions to which they are connected by right and left threads, a high pitch or a double thread being preferably provided, so that a small rotary movement of the rod will cause a relatively large movement of the nuts. This slight turning movement of the rods will cause the clamping engagement of the rods and nuts with the brackets to be loosened to such an extent that the rods may be readily moved relative to the brackets, so that, by merely pulling down on the handle 9 pressure will be applied to the ends of the arms 6, thereby causing the shield to swing forward on its pivots to any open position desired, as shown in Fig. 1. When the shield is opened sufficiently, the operator, before removing his hand from the handle, gives the same a corresponding back or left turn thereby locking the shield in the position to which it was adjusted.

The nuts 11 are merely provided to prevent the rods from being turned to such an extent as to permit the bosses 10ª of the nuts to be carried out of the slots and disturb the adjustment, the nuts 11 being arranged in such positions that, ordinarily, they will not be engaged by the nuts 10 when the rods are unlocked from the bracket, but will be engaged thereby when the nuts 10 have been sufficiently loosened to permit adjustment.

I claim:

1. In combination with a support and a wind shield mounted to swing thereon about a fixed axis, a rod mounted on the shield to rotate about an axis at its central longitudinal line and in parallelism with the axis of the shield and at a substantial distance therefrom, a bracket fixed on the support at each end of said rod and means at each end of said rod for engaging the adjacent bracket to lock the rod thereto on rotation of the rod about its axis in one direction, said means permitting unlocking thereof on opposite rotation, to permit the shield to be adjusted about its axis by a lateral pull on the rod.

2. In combination with a support and a wind shield mounted to swing thereon about a fixed axis, a pair of brackets fixed on said support at each end of the shield and having clamping faces disposed perpendicularly to said axis and extending in concentric relation thereto, arms fixed on the shield and projecting laterally at one side thereof, an operating rod rotatably mounted in the ends of said arms and having oppositely disposed faces arranged to engage the faces of said brackets and means for clamping said faces together on rotation of said rod about its axis in one direction, to lock the shield to the brackets, said means permitting unclamping on opposite rotation thereof, to permit swinging movement of the shield by a lateral pull on the rod.

3. In combination with a support and a wind shield mounted to swing thereon about a fixed axis, a pair of brackets fixed on said support at each end of the frame and having clamping faces disposed perpendicularly to said axis and extending in concentric relation thereto, arms fixed on the shield and projecting laterally at one side thereof, an operating rod rotatably mounted in the ends of said arms about an axis at its longitudinal center and parallel to the axis of the shield and having oppositely disposed faces arranged to engage the faces of said brackets and nuts having oppositely threaded connections with the opposite end portions of said rod arranged to cause said faces to be moved relatively to and from positions of locking engagement with each other on opposite rotation of the rod.

4. In combination with a support and a wind shield mounted to swing thereon about a fixed axis, a pair of rigid arms mounted on said shield at one side of said axis and adjacent the ends of the shield and extending to one side thereof, a stiff rod mounted in the ends of said arms to rotate about an axis at its longitudinal center and parallel to the axis of the shield, a pair of brackets fixed on said support at each end of the shield and means arranged to lock said rod to said brackets, in any position of the shield, on rotation of the rod in one direction, said means permitting unlocking thereof on opposite rotation, to permit swinging movement of the shield.

5. In combination with a support and a wind shield mounted to swing about a fixed axis, a rod mounted on the shield to rotate about an axis at its longitudinal center and parallel to the axis of the shield and at a substantial distance therefrom, a bracket fixed on the support at each end of said rod, each bracket having a slot extending concentrically with the axis of the shield, through which the adjacent end portions of said rod extend, and having faces at its opposite sides adjacent the slot disposed perpendicularly to said axis, and means on the rod about the axis at opposite sides of each bracket arranged to be moved into and out of locking engagement with the faces thereof on opposite rotation of the rod about its axis.

6. In combination with a support and a wind shield mounted to swing about a fixed axis, a rod mounted on the shield to rotate about an axis parallel to the axis of the shield and at a substantial distance therefrom, a bracket fixed on the support at each end of said rod, each bracket having a slot extending concentrically with the axis of the shield, through which the adjacent end portions of said rod extend, and having faces at its opposite sides adjacent the slot disposed perpendicularly to said axis, said rod having a shoulder at each end arranged to be engaged with the faces at one side of the brackets and having nuts provided with right and left threaded connection therewith, to permit said shoulders and nuts to be engaged with said faces to clamp each bracket therebetween on rotation of the rod in one direction and to disengage the same therefrom on opposite rotation thereof.

7. In combination with a support and a wind shield mounted to swing about a fixed axis, a rod mounted on the shield to rotate about an axis parallel to the axis of the shield and at a substantial distance therefrom, a bracket fixed on the support at each end of said rod, each bracket having a slot extending concentrically with the axis of the shield, through which the adjacent end portions of said rod extend, and having faces at its opposite sides adjacent the slot disposed perpendicularly to said axis, said rod having a shoulder at each end arranged to be engaged with the faces at one side of the brackets and having nuts thereon provided with right and left thread connection therewith at the opposite sides of the brackets, said nuts having flattened bosses fitted into said slots to hold the nuts against rotation by the rod, whereby the brackets will be clamped between said shoulders and nuts on rotation of the rod in one direction.

8. In combination with a support and a wind shield mounted thereon for swinging adjustment about a fixed axis, a rigid rod mounted to rotate about an axis at its longitudinal center on the shield at a distance from and in parallelism with the axis thereof, a bracket fixed on the support at each end of the rod, clamping means at each end of the rod arranged to engage the corresponding brackets in the adjusted positions of the shield, to lock the rod thereto on rotation of the rod about its axis in one direction, and to unlock it therefrom on opposite rotation thereof, and a handle on the rod for moving it rotatably to operate said clamping means and laterally to adjust the shield.

9. In combination with a support and a wind shield mounted thereon for swinging adjustment about a fixed axis, a pair of brackets fixed on said support at each end of the shield, each having a pair of clamping faces disposed on opposite sides thereof in perpendicular and concentric relation with said axis, an operating rod composed of two aligned sections arranged in parallel with said axis, each having a shoulder arranged to engage corresponding faces on the brackets and having oppositely threaded nuts arranged to engage the corresponding opposite faces of said brackets, means for holding said nuts against rotation, means permitting lateral movement of the rod relative to the brackets and means permitting relative adjustment of said rod sections to bring said shoulders and nuts into simultaneous clamping engagement with the faces of the brackets when the rod is rotated in one direction.

10. In a device of the character described, a support having a windshield mounted thereon for swinging adjustment about a fixed axis, a rigid arm mounted on and projecting from the shield, a handle mounted for rotation in either direction in said arm and held against lateral displacement with relation to the shield, a bracket fixed on said support and locking means connected to said handle and arranged to lock the handle to the bracket and unlock it therefrom on opposite rotation of the handle, in all positions of the shield.

11. In a device of the character described a support having a windshield mounted thereon for swinging adjustment about a fixed axis, a cylindrically shaped adjusting handle for said shield mounted thereon to rotate about its longitudinal center line and in parallelism with and at a substantial distance from said axis, a bracket fixed on said support, and locking means movable with said handle and arranged to be engaged with said bracket in all the lateral positions of the handle, and to lock the handle to the bracket and unlock it therefrom on opposite rotation of the handle.

12. In a device of the character described, a support having a windshield mounted thereon for swinging adjustment about a fixed axis, a cylindrically shaped adjusting handle for the shield rotatably mounted thereon about its longitudinal center line and at a distance from said axis, a bracket fixed on said support and a clamping device carried by the handle and arranged to clamp the bracket in all the adjusted positions of the shield, to lock the handle to the bracket and to unlock it therefrom on opposite rotation of the handle.

13. In a device of the character described a support having a windshield mounted thereon for swinging adjustment about a fixed axis, a cylindrically shaped pair of rigid arms mounted on the shield and extending to one side thereof, a handle rotatably mounted in said arms at each end about its longitudinal center line and in parallel relation with said axis, a bracket fixed on said support and locking means connected to the handle and arranged to engage the bracket in the different positions of adjustment of the shield to lock the handle to the bracket and unlock it therefrom on opposite rotations of the handle.

14. In a device of the character described, a support having a windshield mounted thereon for swinging adjustment about a fixed axis, a rigid arm mounted on said shield and extending to one side thereof, a cylindrically shaped handle rotatably mounted in said arm about its longitudinal center line and in parallel relation to said axis, a bracket fixed on said support and having a face extending concentrically with the axis of said shield adjacent the path in which the axis of the handle moves when the shield is adjusted, and locking means connected to, and movable with the handle in positions to engage said face in the adjusted positions of the shield, said locking means being movable into and out of locking engagement with said face on opposite rotation of said handle.

15. In a device of the character described, a support having a windshield mounted thereon for swinging adjustment about a fixed axis, a rigid arm mounted on said shield and extending to one side thereof, a rod mounted in said arm to rotate about its longitudinal center line and in parallel relation to said axis, a bracket fixed on said support at one side of said arm and having a slot therein extending in coincidence with the path in which said rod is moved when the shield is adjusted and through which said rod extends, a clamp carried by said rod and arranged to clamp said bracket between the members thereof on rotation of the rod in one direction, and a handle connected to the rod for moving it laterally and rotatably.

16. In combination with a support having a windshield mounted thereon for swinging adjustment about a fixed axis, a cylindrically shaped handle rotatably mounted on the shield about its longitudinal center line at a distance from said axis, and movable transversely of said line with the shield to adjust the latter, and means arranged to be engaged with said support and to be operated by said handle when rotated about said center line, to lock the shield against swinging movement when the handle is rotated in one direction and to unlock it when the handle is rotated in the opposite direction.

17. In combination with a support having a windshield mounted thereon for swinging adjustment about a fixed axis, a cylindrically shaped handle mounted on said shield to rotate about its longitudinal central axis in parallelism with, and at a distance from the axis of the shield, to permit the shield to be swung by a transverse movement of the handle, and locking means arranged to be engaged with said support in all positions of the shield and to be operated by said handle, to lock the shield against swinging movement when the handle is rotated about its axis in one direction and to unlock it when rotated in the opposite direction.

In testimony whereof, I have signed my name to this specification.

WILLIAM A. PROCTOR.